(12) United States Patent
Jacobs et al.

(10) Patent No.: US 10,289,854 B1
(45) Date of Patent: May 14, 2019

(54) APPARATUS, COMPUTER PROGRAM, AND METHOD FOR GENERATING AN INTERMEDIATE ENTITLEMENT SPECIFICATION FOR CONTROLLING ACCESS TO SERVICE OR CONTENT

(71) Applicant: Amdocs Development Limited, Limassol (CY)

(72) Inventors: David Franklyn Jacobs, London (GB); Sarit Shani Natanson, Tel Aviv (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 211 days.

(21) Appl. No.: 15/275,063

(22) Filed: Sep. 23, 2016

(51) Int. Cl.
*G06F 21/62* (2013.01)
*G06F 21/60* (2013.01)
*H04N 21/4627* (2011.01)
*G06F 21/10* (2013.01)

(52) U.S. Cl.
CPC .............. *G06F 21/62* (2013.01); *G06F 21/10* (2013.01); *G06F 21/604* (2013.01); *H04N 21/4627* (2013.01); *G06F 2221/2141* (2013.01)

(58) Field of Classification Search
CPC .. H04N 21/20–21/278; H04N 21/60–21/6587; H04N 21/80–21/835; H04N 21/4627; H04N 21/6334; G06F 21/10; G06F 21/62; G06F 21/604; G06F 2221/2141
See application file for complete search history.

(56) References Cited

U.S. PATENT DOCUMENTS

| 6,941,472 | B2 * | 9/2005 | Moriconi | G06F 21/552 707/999.009 |
| 7,797,239 | B2 | 9/2010 | Smith | |
| 7,984,513 | B1 * | 7/2011 | Kyne | G06F 21/10 706/47 |
| 8,396,800 | B1 * | 3/2013 | Wieder | H04L 67/306 705/50 |

(Continued)

OTHER PUBLICATIONS

Oracle, "Extending the Entitlements Management Tool", 2007, retrieved online from <https://docs.oracle.com/cd/E13169_01/ales/docs26/policymanager/EUI_extension.html>, retrieved on Jun. 10, 2018.*

*Primary Examiner* — Lisa C Lewis
*Assistant Examiner* — Zhimei Zhu
(74) *Attorney, Agent, or Firm* — Zilka-Kotab, P.C.

(57) ABSTRACT

An apparatus, computer program, and method are provided for generating an intermediate entitlement specification that specifies one or more access rights in connection with a service or content. A plurality of entitlement policies is stored that are configured for being used to determine one or more entitlements to be sent to a device. In operation, an offer specification is received, and at least one of the plurality of entitlement policies is identified based on the offer specification. An intermediate entitlement specification is generated that specifies one or more access rights in connection with a service or content, based on at least one entitlement policy. In use, a run-time entitlement specification may be generated, in response to a request for the service or content during a run-time. Further, in one embodiment, the run-time entitlement specification may be generated utilizing at least one intermediate entitlement specification.

7 Claims, 8 Drawing Sheets

(56) References Cited

U.S. PATENT DOCUMENTS

| | | | |
|---|---|---|---|
| 8,478,693 B1* | 7/2013 | Weigle | G06F 21/10 |
| | | | 705/51 |
| 8,484,714 B2* | 7/2013 | Weber | G06F 21/6236 |
| | | | 709/220 |
| 8,824,372 B2 | 9/2014 | Hoggan et al. | |
| 9,379,932 B1* | 6/2016 | Bakar | H04N 21/25875 |
| 9,467,726 B1* | 10/2016 | Le-Chau | H04N 21/262 |
| 9,619,314 B2* | 4/2017 | Nagura | H04L 41/0663 |
| 9,692,767 B2* | 6/2017 | Stappenbeck, Jr. | H04L 63/105 |
| 9,973,509 B2* | 5/2018 | Martinelli | H04L 63/101 |
| 2005/0228982 A1* | 10/2005 | Nakayama | G06F 21/606 |
| | | | 713/150 |
| 2007/0056019 A1* | 3/2007 | Allen | G06F 21/6236 |
| | | | 726/1 |
| 2007/0248078 A1* | 10/2007 | Gundavelli | H04L 41/08 |
| | | | 370/352 |
| 2008/0163340 A1* | 7/2008 | Cheeniyil | H04L 63/102 |
| | | | 726/3 |
| 2008/0184336 A1* | 7/2008 | Sarukkai | G06F 21/6218 |
| | | | 726/1 |
| 2009/0077621 A1* | 3/2009 | Lang | H04L 63/0263 |
| | | | 726/1 |
| 2010/0169982 A1* | 7/2010 | Kakehi | G06F 21/105 |
| | | | 726/28 |
| 2012/0151602 A1* | 6/2012 | Lu | G06F 21/10 |
| | | | 726/27 |
| 2013/0055408 A1 | 2/2013 | Hall et al. | |
| 2014/0040973 A1 | 2/2014 | Bhat | |
| 2014/0195025 A1* | 7/2014 | Wieder | G06F 21/10 |
| | | | 700/94 |
| 2014/0195026 A1* | 7/2014 | Wieder | H04L 67/306 |
| | | | 700/94 |
| 2014/0195919 A1* | 7/2014 | Wieder | H04L 67/306 |
| | | | 715/730 |
| 2015/0269383 A1* | 9/2015 | Lang | G06F 21/57 |
| | | | 726/1 |
| 2016/0344743 A1* | 11/2016 | Dotan | H04L 63/108 |
| 2017/0126741 A1* | 5/2017 | Lang | H04L 63/20 |

* cited by examiner

APPARATUS, COMPUTER PROGRAM, AND METHOD FOR GENERATING AN INTERMEDIATE ENTITLEMENT SPECIFICATION FOR CONTROLLING ACCESS TO SERVICE OR CONTENT

FIELD OF THE INVENTION

The present invention relates to digital content/service access systems, and more particularly to controlling access to digital content/service access systems.

BACKGROUND

IP networks are often used by Communications Service Providers (CSPs) to control access to digital services and digital content. However, along with the proliferation of connected computing devices, the growth of digital content, and the increase in user-based services, there exists a need for fine grained control of entitlements that are used to control access to such digital services and digital content.

Additionally, factors contributing to the need for fine grained control of entitlements include a transition from account-based services to user-based services alongside personalization of user experiences to increase usage and monetization; growth in the type and number of services available (including offers for such services); an increasing use of applications to distribute services and content, and the need of service providers to distribute such services and content; a granularity of contractual obligations and rights associated with content distribution (such as where, when and on what device content and services can be accessed); and/or a variability of business models for accessing to digital services and digital content.

Whilst most digital platforms have inbuilt entitlements capabilities to control access to its associated services and content, such capabilities lack awareness of entitlements that are maintained by adjacent digital services. Additionally, such digital platforms generally have proprietary data models requiring dedicated operations and management interfaces. For CSPs, this results in a fragmented entitlements regime and limits business models to the entitlement capabilities of each digital platform. Moreover, a lack of a common entitlements data model makes implementation of a multi-governance operational model (multiple systems managing entitlements) impractical as each ordering and fulfillment system would need unique integrations with all of the digital platforms for which services are offered.

These challenges are further compounded for content aggregators, such as Multichannel Video Programming Distributors (MVPD), as the user's entitlement to access a TV channel or stream, an item of content, etc. needs to be determined at point of consumption. This is due to content distribution rights which specify when, how and under what circumstances an item of content can be consumed. Additionally, it may be beneficial for MVPDs to allow content to be consumed at any time, on any device, and in any location.

The typical response by CSPs to address these challenges is to build a dedicated entitlements solution for each service with entitlement capabilities that meet the service's specific needs. However, this approach increases further architectural fragmentation and operational overhead.

There is thus a need for addressing these and/or other issues associated with the prior art.

SUMMARY

An apparatus, computer program, and method are provided for generating an intermediate entitlement specification that specifies one or more access rights in connection with a service or content. A plurality of entitlement policies is stored that are configured for being used to determine one or more entitlements to be sent to a device. In operation, an offer specification is received, and at least one of the plurality of entitlement policies is identified based on the offer specification. An intermediate entitlement specification is generated that specifies one or more access rights in connection with a service or content, based on at least one entitlement policy. In use, a run-time entitlement specification may be generated, in response to a request for the service or content during a run-time. Further, in one embodiment, the run-time entitlement specification may be generated utilizing at least one intermediate entitlement specification.

DETAILED DESCRIPTION

Figure 1A:
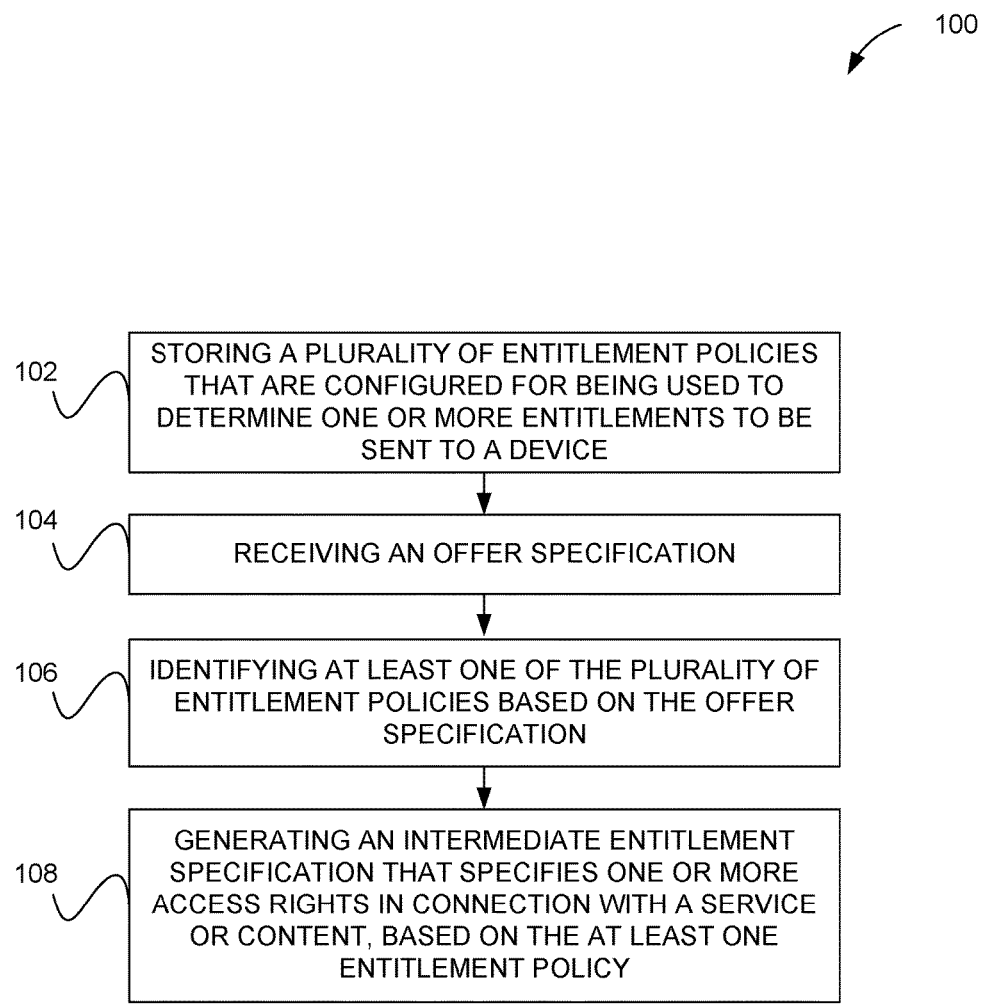
FIG. 1A illustrates a method for generating an intermediate entitlement specification that specifies one or more access rights in connection with a service or content, in accordance with one embodiment.

FIG. 1A illustrates a method 100 for generating an intermediate entitlement specification that specifies one or more access rights in connection with a service or content, in accordance with one embodiment. In the context of the present description, such intermediate entitlement specification may include any data structure that identifies and/or may be used to identify entitlement, in terms of access abilities to a service and/or content (and/or any portion and/or aspect thereof), where such data structure includes a version that precedes another version of the entitlement specification that is used thereafter. For example, in one possible embodiment, the intermediate entitlement specification is a mezzanine entitlement.

As shown, per operation 102, a plurality of entitlement policies is stored that are configured for being used to determine one or more entitlements to be sent to a device. In the context of the present description, the entitlement policies may each refer to any rule, strategy, and/or principle that is capable of being used to determine one or more entitlements to be sent to a device. Further, such one or more entitlements may be determined by identifying the same, and/or providing any other information, criteria, etc. that may be used to determine whether and/or which the one or more entitlements are to be sent. Still yet, the aforementioned entitlements may refer to any content and/or service capable of being sent to the device.

Even still, the foregoing such storage may be carried out utilizing any desired local or remote, volatile or non-volatile memory that may or may not be structured in the form of a database, etc. Further, the device may refer to any mobile device (e.g. phone, personal digital assistant (PDA), laptop, tablet, vehicle, wearable such as a watch, a set top box a.k.a. an integrated receiver/decoder (IRD), etc.), a personal computer, a server, and/or any other device that is capable of accessing a content and/or service. More information regarding various forms of memory/devices will be set forth during the description of subsequent embodiments.

In operation 104, an offer specification is received. In the present description, such offer specification may include any data structure that identifies and/or may be used to identify an offer to be made to a user of the device. Further, the offer specification may be received in any desired manner (e.g. manual entry, automated receipt such as from a preceding processing module, over a network, etc.). In one possible embodiment, the offer specification may include a customer facing service (CFS) specification.

Further, in operation 106, at least one of the plurality of entitlement policies is identified based on the offer specification. It should be noted that the at least one entitlement policy may be identified in any desired manner that is a function of the offer specification. For example, the offer specification may itself identify or describe the at least one entitlement policy, may be associated with (e.g. linked to, etc.) the at least one entitlement policy, and/or include a table, logic, criteria, parameters, and/or any other information that may be used to identify the at least one entitlement policy.

To this end, an intermediate entitlement specification is generated in operation 108 that specifies one or more access rights in connection with a service or content, based on the at least one entitlement policy. It should be noted that the intermediate entitlement specification may be generated in any desired manner that is a function of the at least one entitlement policy. For example, the at least one entitlement policy may itself identify or describe the intermediate entitlement specification (or vice-versa), may be associated with (e.g. linked to, etc.) the intermediate entitlement specification, and/or include a table, logic, criteria, parameters, and/or any other information that may be used to generate the intermediate entitlement specification. In one possible embodiment, the intermediate entitlement specification may be generated based on the at least one entitlement policy, by including the at least one entitlement policy in the intermediate entitlement specification. More information regarding one or more ways the intermediate entitlement specification may be generated based on the at least one entitlement policy will be set forth later in greater detail during reference to subsequent embodiments.

In use, the intermediate entitlement specification may be stored for use in any desired manner. For example, a run-time entitlement specification may be generated based on at least one intermediate entitlement specification. In the context of the present description, the run-time entitlement specification may refer to any data structure that identifies and/or may be used to identify entitlement, in terms of access abilities to a service and/or content (and/or any portion and/or aspect thereof), where such data structure is used during (or for) run-time. To this end, access to the service or content may be controlled, utilizing the run-time entitlement specification.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

For example, in one embodiment, a run-time entitlement specification may be generated, in response to a request for the service or content during a run-time. Specifically, the run-time entitlement specification may be generated by identifying an identifier in connection with the request, and selecting at least one of a plurality of the intermediate entitlement specifications based on the identifier, such that the run-time entitlement specification is generated utilizing the at least one intermediate entitlement specification. In various aspects of the present embodiment, the identifier may include an account identifier, a user identifier, and/or a device identifier.

In yet another embodiment, the run-time entitlement specification may be generated by identifying service or content information in connection with the request, and selecting at least one of a plurality of the intermediate entitlement specifications based on the service or content information, such that the run-time entitlement specification is generated utilizing the at least one intermediate entitlement specification. In various aspects of the present embodiment, the service or content information may include at least one of a service type, a content type, a service identifier, a content identifier, or a geo-location.

In still yet another embodiment, the run-time entitlement specification may be generated, based on the at least one entitlement policy. As a further option, a separate data source may be accessed in connection with the generation of the intermediate entitlement specification.

Figure 1B:
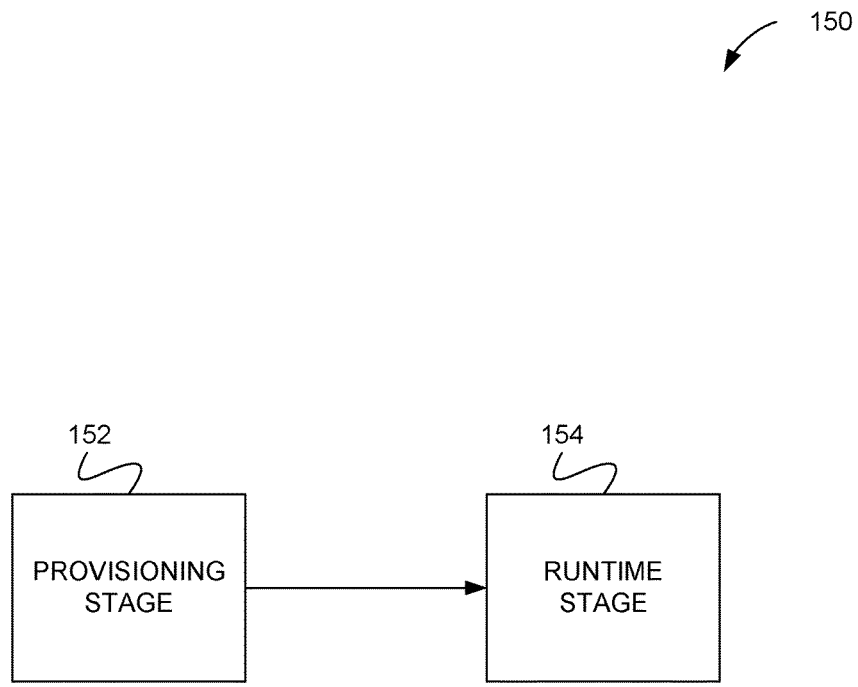
FIG. 1B illustrates a framework for generating and using an intermediate entitlement specification, in accordance with one embodiment.

FIG. 1B illustrates a framework 150 for generating and using an intermediate entitlement specification, in accordance with one embodiment. As an option, the framework 150 may be implemented in the context of any one or more of the embodiments set forth in any previous and/or subsequent figure(s) and/or description thereof. However, it is to be appreciated that the framework 150 may be implemented in the context of any desired environment.

As shown, the framework 150 implements two stage programmable entitlements to enable granular and contextual access control to multiple services or content. Specifically, a provisioning stage 152 occurs when a service and/or content is initially provisioned. On provisioning, the framework 150 calculates an intermediate entitlement specification, such as a mezzanine entitlement, based on each service and/or content that is provisioned to an account or user identifier (ID). While provisioned services and/or content detail the generic identity of the service and/or content, such as a particular TV channel (e.g. ABC TV channel, etc.), the mezzanine entitlements detail the specific service (e.g. particular affiliate of the TV channel such as WNEP-TV, etc.) that the user is able to access, which is based on the account service address.

With continuing reference to FIG. 1B, the framework 150 further implements a run-time stage 154 when a user attempts to access the service and/or content. At that time, the framework 150 calculates the entitlement based on the rights of the provisioned services and/or content and the context of the device that has the potential to access the same. Rights and context may include, but are not limited to, a network connection being used to access the service and/or content, a location of the user, a type of device being used, etc.

In one embodiment, the framework 150 may be independent of any business platforms used for ordering services and/or content, and further may be decoupled from any service and/or content platforms used for delivery. The intermediate entitlement specifications (e.g. mezzanine entitlements, etc.) may be created by decomposing entitlements for an assigned content and/or service to the lowest level possible whilst being independent of a run-time context. Runtime entitlement specifications may be determined based on the mezzanine entitlements and the context of the user and/or device being used.

On completion of an order, mezzanine entitlements may be calculated and assigned to a user or device based on policies associated with the ordered product. Entitlements data can include but is not limited to those set forth in Table 1 below.

TABLE 1

ENTITLEMENTS DATA

The user and/or device identities that are bound by a constraint of an entitlement
Data needed to generate licenses for accessing a service or content
Policies that specify terms of usage such as when, where, and on what device At a time of access (or any other suitable time), run-time entitlement specifications may be calculated based on the mezzanine entitlements and the context of the user or device such as location, device type, network access, etc., and a policy associated with the service and/or content being accessed.

Thus, the two stage programmable entitlements framework 150, together with possible use of virtualization and hosting of services in a network, may enable communications service providers (CSPs) to minimize a need for physical provisioning and control access to services and/or content based on entitlements only. Possible benefits of this may include, but are not limited to, reduced time to revenue based on a reduction in time from ordering to activation, improved customer satisfaction as a result of instant access to service, and/or lower operating costs due to reduced fulfilment complexity.

Figure 2:
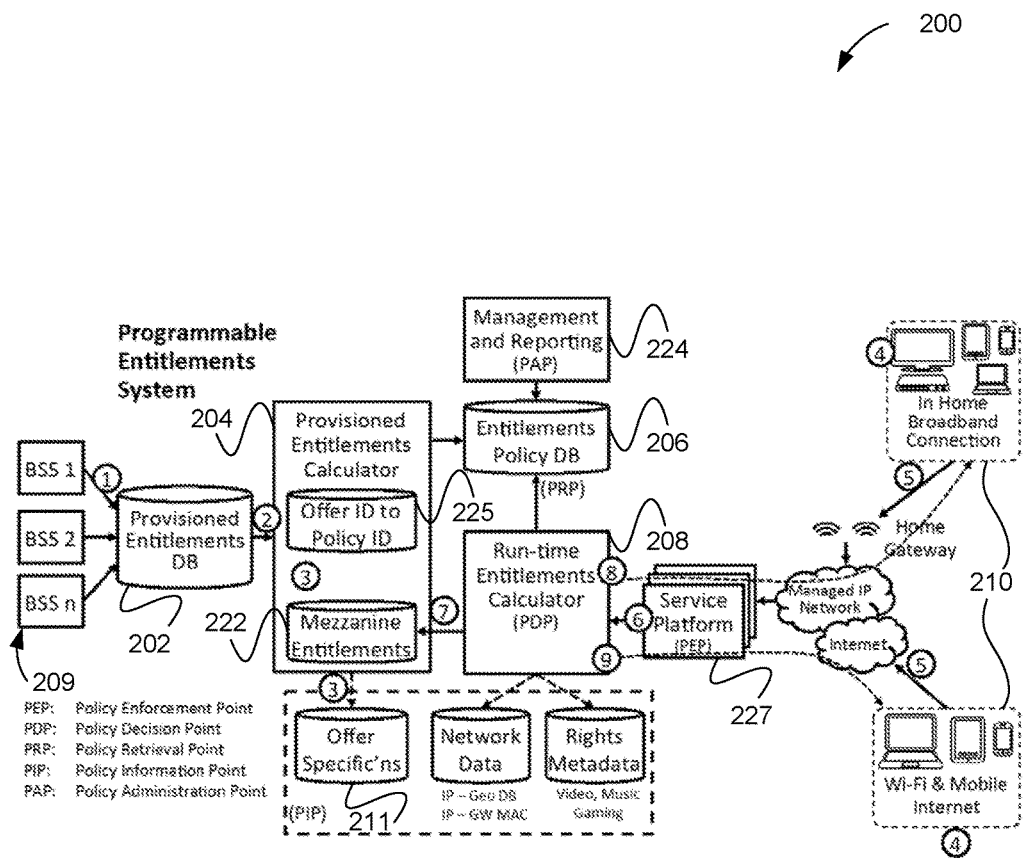
FIG. 2 illustrates a system for generating and using an intermediate entitlement specification, in accordance with one embodiment.

FIG. 2 illustrates a system 200 for generating and using an intermediate entitlement specification, in accordance with one embodiment. As an option, the system 200 may be implemented in the context of any one or more of the embodiments set forth in any previous and/or subsequent figure(s) and/or description thereof. For example, the system 200 may be used to implement the method 100 of FIG. 1A, and/or the framework 150 of FIG. 1B. However, it is to be appreciated that the system 200 may be implemented in the context of any desired environment.

As shown, the system 200 includes a provisioned entitlements database 202, a provisioned entitlements calculator 204, an entitlements policy database 206, and a run-time entitlements calculator 208 that supports role-based access control (RBAC) and attribute based access control (ABAC). In use, entitlements are added, modified, and/or deleted in the provisioned entitlements database 202 by one or more business support systems (BSS) 209. Further, clients 210 such as digital service platforms, partner platforms, and self-care applications request entitlements from the run-time entitlements calculator 208. Such clients 210 may optionally provide parameters to be included in any entitlements calculation.

In operation, the provisioned entitlements database 202 is used to store reference relationships of account IDs, user IDs, and device IDs with one or more offer specification (in an offer specification database 211) of any provisioned service and/or content together with an entitlement policy ID of an associated entitlement policy. Further, offer specifications may be stored as self-describing data enabling the provisioned entitlements database 202 to support a multi-governance provisioning model whereby any authorized BSS system may add, modify or delete an offer specification association from an account, user, and/or device ID. As an option, a publish/subscribe interface (not shown) may notify the provisioned entitlements calculator 204 of newly provisioned entitlements or modifications and/or deletions of existing provisioned entitlements.

The entitlements policy database 206 presents a policy resource point (PRP) and stores the policies in compliance with the Organization for the Advancement of Structured Information Standards (OASIS) eXtensible access control markup language (XACML) specification that are used by the provisioned entitlements calculator 204 to determine the entitlements to be stored in a mezzanine entitlements database 222. The policies are written and managed by a management and reporting system 224 which acts as a policy administration point (PAP). The entitlements policy database 206 also stores the policies that are referenced in a mezzanine entitlement that are used by the run-time entitlements calculator 208 to determine the entitlements to be returned to a requesting client, which are based on parameters that the client provides.

Turning to provisioned entitlements calculator 204, such component subscribes to notifications from the provisioned entitlements database 202. When notified of a new entitlement or an update to an existing entitlement, the provisioned entitlements calculator 204 retrieves the entitlements policy associated with the offer specification from the entitlements policy database 206 that is acting as the policy resource point (PRP). Using the entitlements policy and the offer specification, the provisioned entitlements calculator 204 calculates and stores mezzanine entitlements for the account, user, and/or device ID. In one embodiment, the mezzanine entitlements may include specifications detailing access rights of an account, user, and/or device to consume a service and/or content together with an identity of the policy that specifies how the mezzanine entitlements should be modified under known user contexts.

Calculation of mezzanine entitlements may require referencing of data sources that are external to the system 200 such as using an attribute in the offer specification to discover a corresponding resource attribute from a database based on a user service address. In this regard, the offer specification database 211 acts as a policy information point (PIP). Mezzanine entitlements may thus be used directly to generate licenses for services and/or content that do not make use of run-time consumption context The run-time entitlements calculator 208 serves as a policy decision point (PDP) and responds to OASIS XACML specification compliant requests from policy enforcement point (PEP) clients requesting entitlements associated with a unique identifier that may include, but is not limited to, an identity of an account, user, device, partner, application, etc. The clients 210, such as digital platforms, network elements, and self-service applications, may optionally pass parameters with the request for entitlements that can include, but are not limited to those listed in Table 2.

TABLE 2

| Parameter | Description |
|---|---|
| Account ID | Globally Unique Identifier, such as 432350H0U423SF2H, of the Account that is being used to access the service or content. |
| User ID | Globally Unique Identifier, such as email address, of the User who is accessing the service or content. |
| Device ID | Globally Unique Identifier such as MAC address of the device that is being used to access the content or service. |
| Application ID | Type or Identity of the application that is being used to access the content or service. |
| Session ID | Globally Unique Identifier such as a session cookie of the application that is being used to access the content or service. |
| Partner ID | The ID of the partner, such as their partner account number that is being used to access the content or service. |
| Device Type | The type of device, such as a Sony PS4 or Safari Browser on a Mac Book PC, that is being used by the end user. |
| Geo-location | The location co-ordinates of the user or device that is being used to access the content or service. |
| Access Method | An identifier that indicates the network type that is being used to access the content or service. |
| Content ID | The ID of the content item, such as Tribune Media Service (TMS) ID, that is being accessed by the requesting account, user or device. |
| Service ID | The ID of the service, such as the service name, that is being accessed by the requesting account, user or device. |
| Service Type | The class or category of entitlement that is requested to be returned, such as Broadband or Linear TV. |
| Etc. | Etc. |

In use, requests may request retrieval of entitlements for a specific service, item of content, and/or for all entitlements related to a service/content. Upon the receipt of an entitlements request, the run-time entitlements calculator 208 inspects the request to ascertain the entitlements key such as account, user, and/or device ID to be used to retrieve the required mezzanine entitlements and the request type to determine the type of the calculation required, including service type (e.g. get all broadband access entitlements), service ID (e.g. get entitlements for premium linear TV), and/or content ID (e.g. get entitlements for a particular show).

The entitlements key and request type are then used to retrieve the associated mezzanine entitlements together with the embedded entitlement policy ID. Multiple mezzanine entitlements may be returned for a given service type or service ID with each having its own associated policy. The run-time entitlements calculator 208 uses the retrieved mezzanine entitlements together with the entitlement policies and any parameters, contained within the entitlements request, to calculate the run-time entitlements for the requesting client. Strictly as an option, the entitlement policies may contain alternative service and/or content items that are to be returned to a requesting client when the run-time calculation determines that the context of the requesting user or device is prohibited from accessing the service or content specified in the mezzanine entitlement.

Next, the run-time entitlements calculator 208 returns the resultant entitlements to the requesting client. In one embodiment, calculation of run-time entitlements may require referencing data sources that are external to the entitlements system such as rights metadata in a digital platform that acts as a policy information point (PIP) for a specific content ID. The run-time entitlements calculator 208 may access remote content directly or cache external data for performance optimization purposes.

An example illustrating how programmable entitlements may be used to control access to digital TV content in compliance with contractual terms between a service provider and one or more content providers will now be described. Specifically, the contractual terms encompassing a user's subscription to an Internet Protocol (IP)-delivered television (TV) service is set forth in Table 3.

TABLE 3

1. The user is able to access all content to which they are subscribed on any device so long as they are using a device that is connected to their home broadband connection
2. Content that is only licensed for consumption whilst connected to the broadband connection in the registered service address must not be shown when accessing the TV service via an Internet connection
3. Channels that are showing live regional sports are required to be blacked out on devices that are located in the TV area where the sports event is playing for the duration of the event
4. Live regional sports content can be accessed when the user is accessing live regional sports content when connected to the Internet outside of the TV area where the sports event is playing In such context, mezzanine entitlements are calculated following the ordering activity, which has been initiated by a consumer accepting an offer to subscribe to a bundle of TV channels. Specifically, as indicated in step 1 of FIG. 2, one or more of the BSS systems 209 provisions a record in the provisioned entitlements database 202 that is keyed by the user's account number. Such a record contains an offer ID, service address of the user, and a MAC address of the broadband gateway in the user's service address. Having received a notification of a new entitlement record, the provisioned entitlements calculator 204 retrieves, in step 2, the entitlements policy associated with the offer ID contained in the entitlement record. This may be accomplished with a mapping stored in a database 225 that maps offer IDs to policy IDs (associated with specific entitlement policies).

At step 3, a specification detailed in the entitlements policy instructs the provisioned entitlements calculator 204 to decompose the offer ID into its lowest level service ID (e.g. local TV station) and assign to it the relevant policy to be used for calculating the run-time entitlements for the service. Calculations may be performed using external reference data that maps offer IDs to service plans, and service plans to service IDs, based on the service address of the account. Service IDs refer to service specifications that are used by the client 210 to access the service or content item. The resultant local service IDs may be stored against the account as linear mezzanine entitlements.

Next, calculation of run-time entitlements may ensue. Specifically, the user may, for example, attempt to access a TV service via an application running on an IP connected device. The device may further be connected to a broadband gateway in the service address associated with the user's account. A sequence is then carried out to calculate the required run-time entitlements.

Specifically, in step 4, the user is authenticated (e.g. logged in) to the TV service using their account number. Next, in step 5, the application requests information from a TV service platform 227 to build an interface for the user to select an item of content to consume. The application passes the user's account number, IP address, the type of device, and the application being used. Then, in step 6, the TV service platform 227 requests, from the run-time entitlements calculator 208, the entitlements for the account that have a service type of linear TV. Included in the request is the IP address of the requesting device, the device type, and application type.

Next, in step 7, the run-time entitlements calculator 208 retrieves the mezzanine entitlements with a service type of linear TV and retrieves the run-time policy associated with each entitlement. Further, in step 8, for service IDs that can only be accessed within the service address, the run-time policy instructs the run-time entitlements calculator 208 to determine if the accessing device is connected to the broadband connection at the service address. It does so by comparing the MAC address associated with the IP address in the request parameters with the MAC address of the broadband gateway installed at the service address. It should be noted that the service ID and associated service specification is only returned to the requesting client if the MAC address matches.

By this design, per step 9, for service IDs that can only be accessed when the accessing device is not in the same TV area as a live regional sports event, the run-time policy instructs the run-time entitlements calculator 208 to determine the geolocation of the device. The run-time entitlements calculator 208 may do so by using the IP address in the request parameters to look up the geolocation in an IP-to-geolocation database.

Thus, the service ID and associated service specification for the regional sports channel is only returned to the requesting client if the IP address resolves to a geolocation that is not in the TV area of the sports event. Further, if the geolocation resolves to the TV area of the sports event, an alternative service ID is returned that shows alternative content or a blackout panel.

It should be noted that the same run-time calculation sequence may occur when the user attempts to access the TV service when connected to an IP connection that is not using the broadband connection in the service address. In such case, the run-time entitlements calculator 208 may determine that the user is not in the service address and returns only the service IDs and associated service specifications that are permitted for out-of-home consumption.

Figure 3:
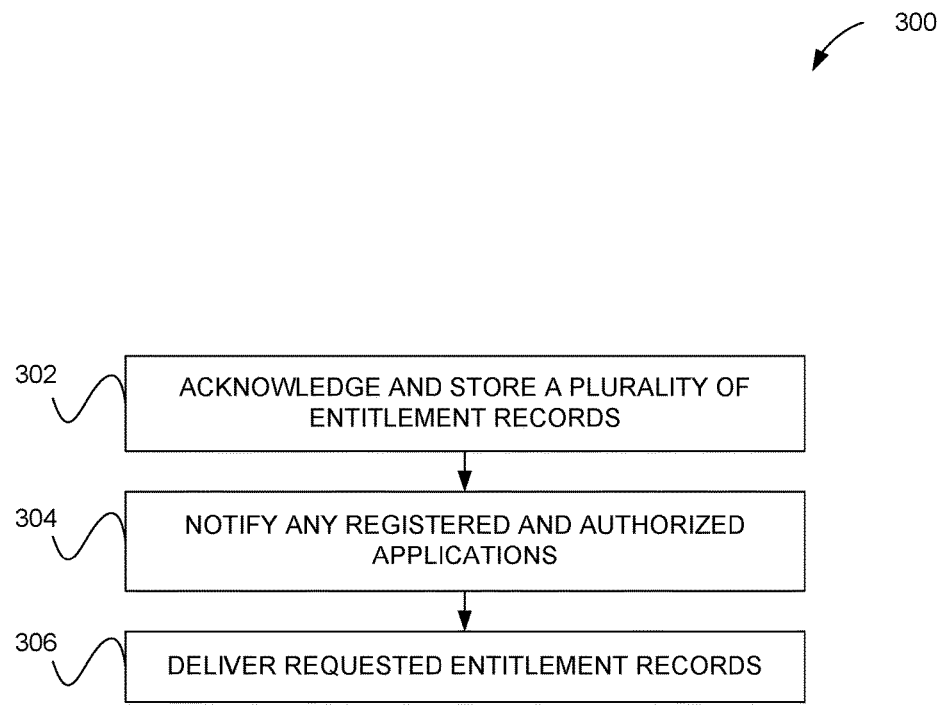
FIG. 3 illustrates a method for storage of provisioned entitlements, in accordance with one embodiment.
Figure 4:
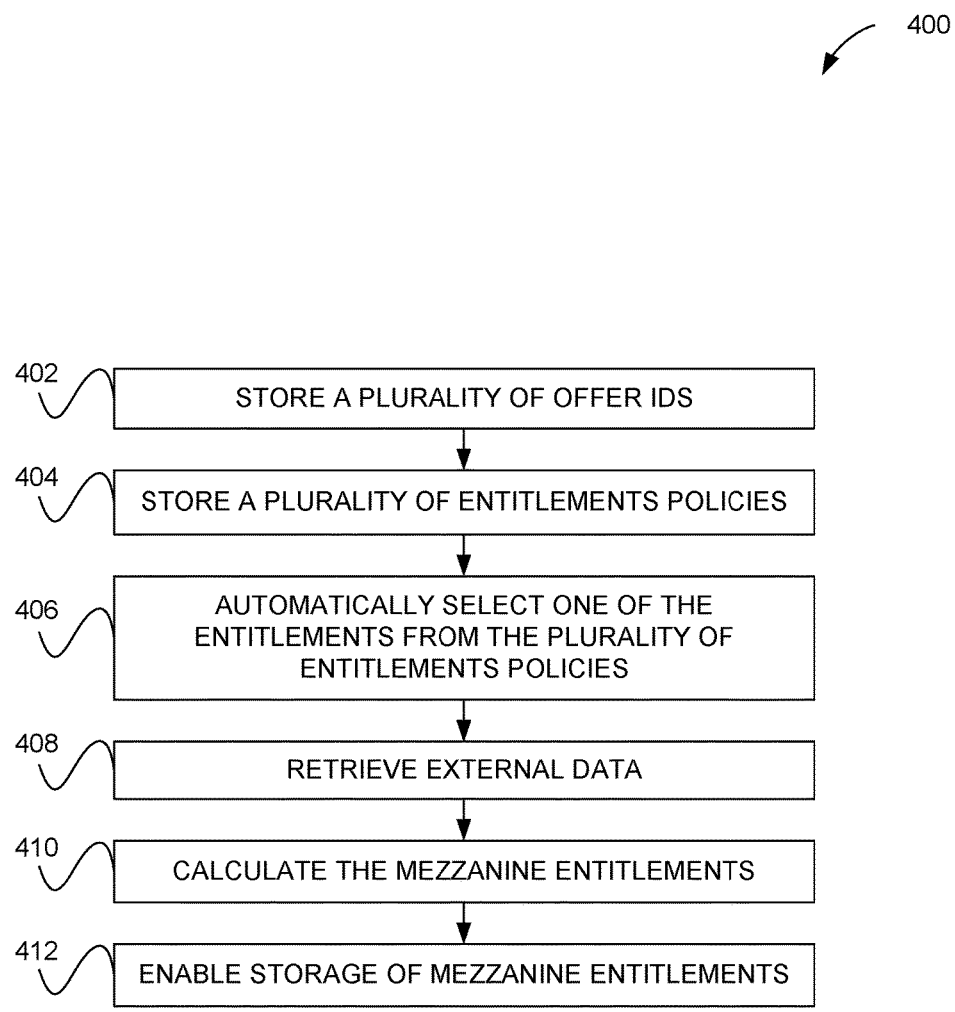
FIG. 4 illustrates a method for intermediate entitlement specification generation, in accordance with one embodiment.
Figure 5:
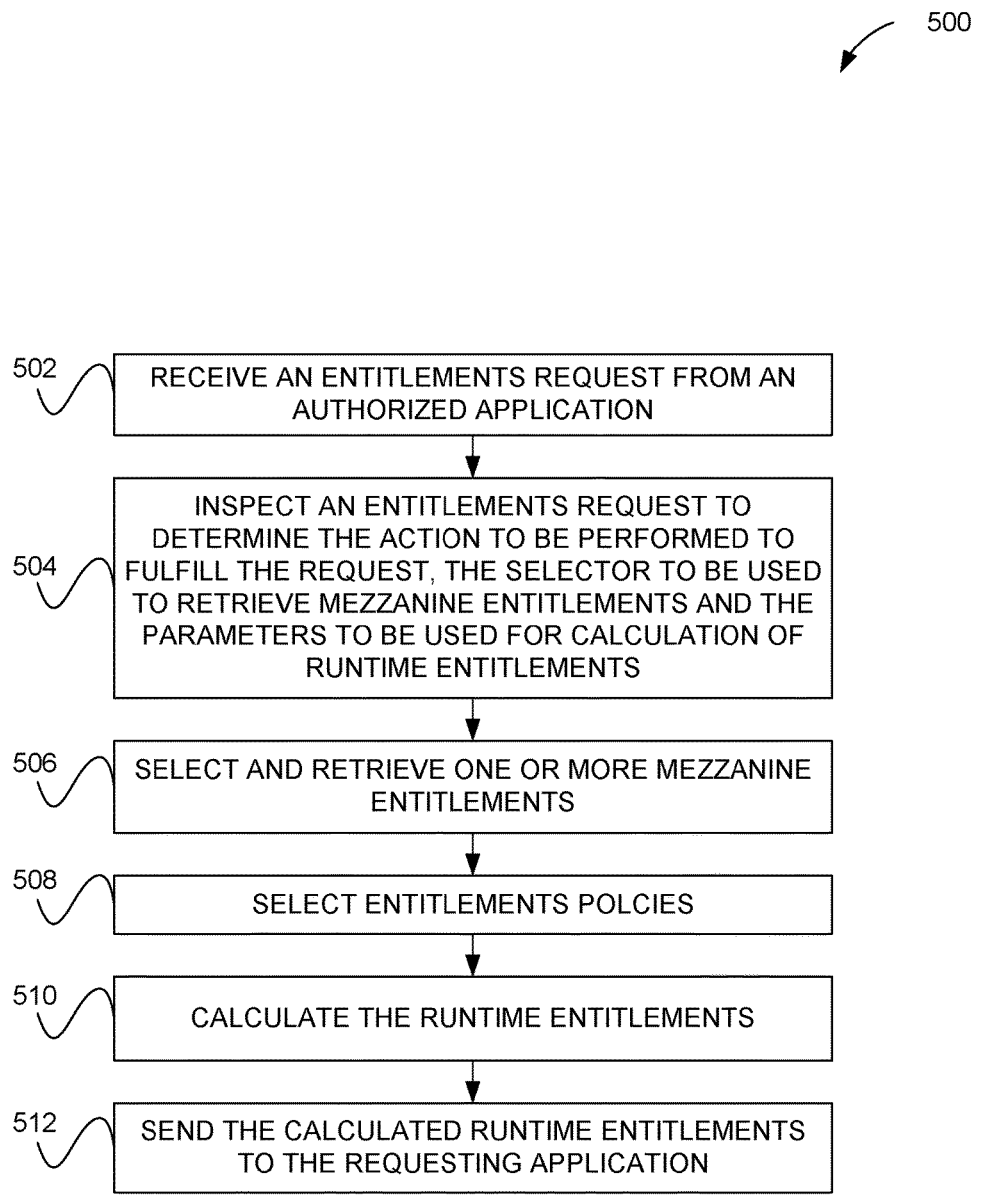
FIG. 5 illustrates a method for run-time entitlement specification generation, in accordance with one embodiment.

FIGS. 3-5 illustrates various methods 300, 400, 500 for storage of provisioned entitlements, intermediate entitlement specification generation, and run-time entitlement specification generation, in accordance with various embodiments. As an option, the methods 300, 400, 500 may be implemented in the context of any one or more of the embodiments set forth in any previous and/or subsequent figure(s) and/or description thereof. For example, the methods 300, 400, 500 may be carried out in the context of the relevant components of the system 200 of FIG. 2. However, it is to be appreciated that the methods 300, 400, 500 may be implemented in the context of any desired environment.

Specifically, FIG. 3 illustrates a method 300 for storage of provisioned entitlements, in accordance with one embodiment. In one possible embodiment, such storage of provisioned entitlements may be carried out utilizing the provisioned entitlements database 202 of FIG. 2. As shown, in operation 302, a plurality of entitlement records is acknowledged and stored. In one embodiment, the entitlement records may be referenced by a unique account, user and/or device IDs. Further, the entitlement records may each contain one or more associated offer specifications and any optional attributes related to the account, user and/or device ID.

Next, in operation 304, any registered and authorized applications may be notified of any additions, modifications and/or deletions of entitlement records. Further, in operation 306, requested entitlement records may be delivered to any registered and authorized application.

FIG. 4 illustrates a method 400 for intermediate entitlement specification generation, in accordance with one embodiment. In one possible embodiment, such intermediate entitlement specification generation (e.g. calculation) may be carried out utilizing the provisioned entitlements calculator 204 of FIG. 2. As shown, in operation 402, a plurality of offer IDs are stored. Such offer IDs may each refer to a unique entitlements policy.

Next in operation 404, a plurality of entitlements policies is stored. Such entitlements policies are capable of being applied to one or more offer specification instances that are associated with an account, user and/or device identity. Further, in operation 406, one of the entitlements is automatically selected from the plurality of entitlements policies. It should be noted that such selection may be based on the attributes of an offer specification instance.

In operation 408, external data may then be retrieved. Such external data may be associated with the specified account, user, and/or device identity, as specified in the selected entitlements policy. Further, the mezzanine entitlements may be calculated. See operation 410. In use, this may be accomplished using the selected entitlements policy. Further, the mezzanine entitlements may be calculated for an account, user, and/or device identity from the attributes referred to by the offer specification instances and any retrieved external data (again, see operation 408).

With continuing reference to FIG. 4, in operation 412, storage is enabled of mezzanine entitlements keyed against the account, user and/or device identities in a database (e.g. mezzanine entitlements database 222 of FIG. 2, etc.) that can be accessed by the run-time entitlements calculator.

FIG. 5 illustrates a method 500 for run-time entitlement specification generation, in accordance with one embodiment. In one possible embodiment, such run-time entitlement specification generation (e.g. calculation) may be carried out utilizing the run-time entitlements calculator 208 of FIG. 2. In operation 502, an entitlements request is received from an authorized application.

In response (in operation 504), an entitlements request is inspected to determine a variety of items. Specifically, an action is determined that is to be performed to fulfill the request. Further, a selector is determined that is to be used to retrieve mezzanine entitlements. Still yet, parameters are determined that are to be used for calculation of run-time entitlements.

Next, in operation 506, one or more mezzanine entitlements are selected and retrieved from a plurality of mezzanine entitlements using the selector in the entitlements request (see, again, operation 504). Then, in operation 508, the entitlements policies are selected from a plurality of entitlement policies using the policy ID specified in each of the mezzanine entitlements. Further, in operation 510, the run-time entitlements are automatically calculated for each mezzanine entitlement using the parameters provided in the originating entitlements request. To this end, the calculated run-time entitlements may be sent to the requesting application. See operation 512.

Figure 6:
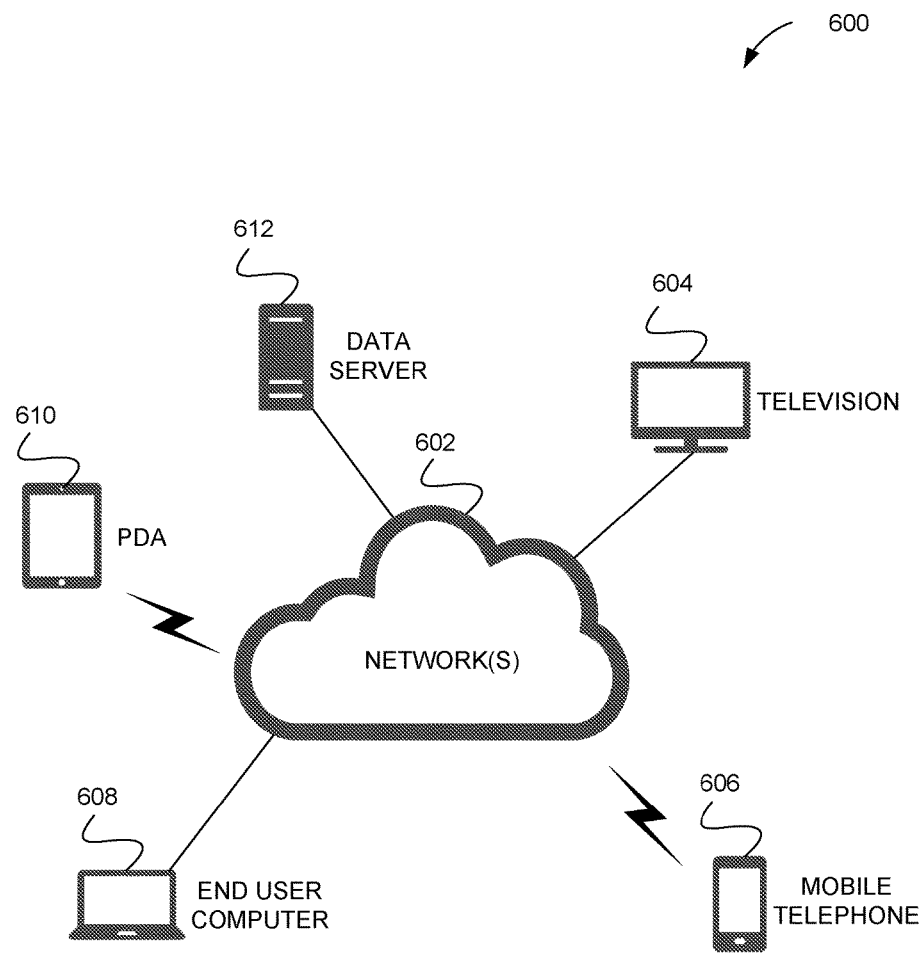
FIG. 6 illustrates a network architecture, in accordance with one possible embodiment.

FIG. 6 illustrates a network architecture 600, in accordance with one embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
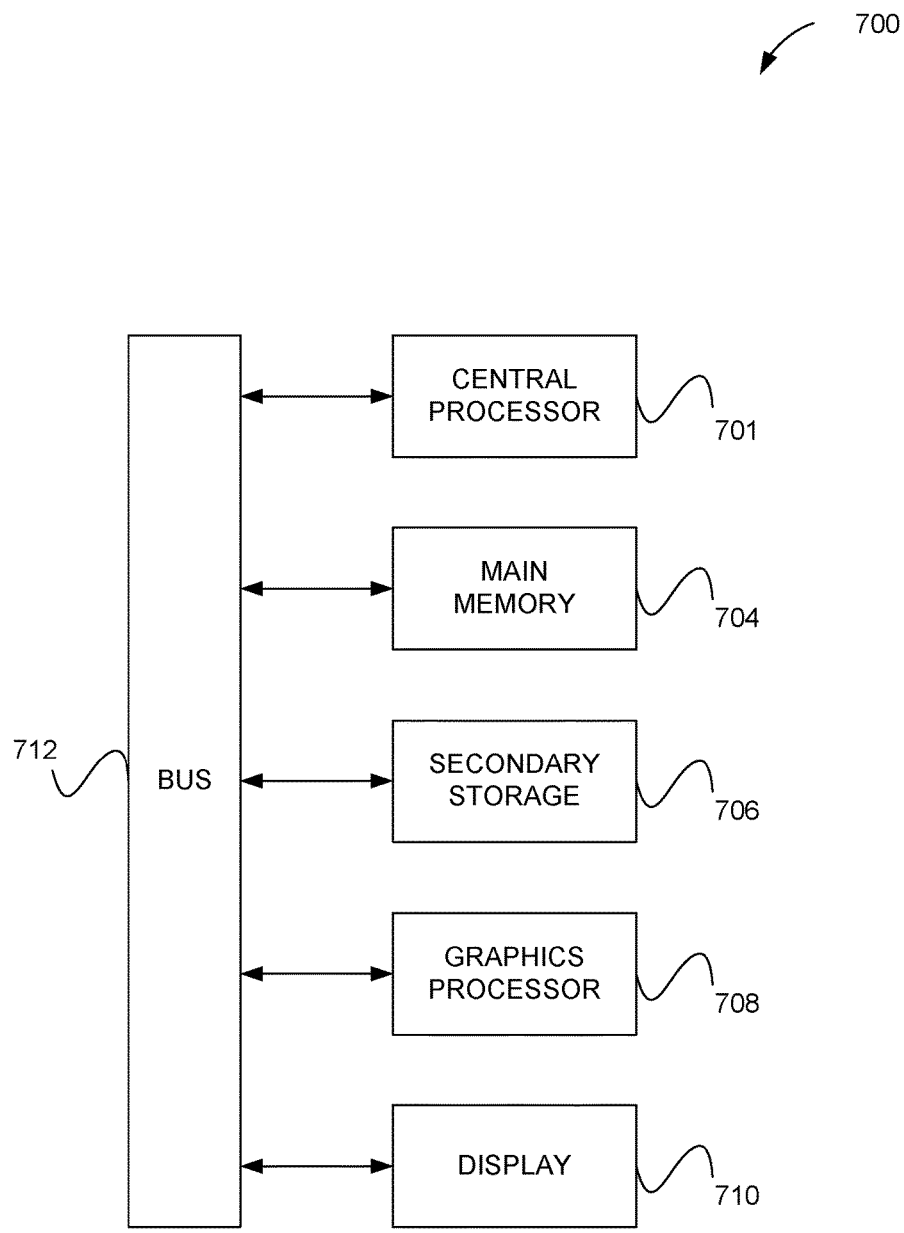
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A non-transitory computer readable medium storing computer code that when executed by a processor causes the processor to:
   store, in an entitlements policy database, a plurality of entitlement policies that are configured for being used to determine at least one of content and services allowed to be accessed;
   store, in a provisioned entitlements database, a record for a newly provisioned entitlement including:
      an offer identifier that specifies an offer made to a user for an entitlement to at least one of particular content and particular services,
      an account identifier that identifies an account of a user that accepted the offer,
      a user identifier that identifies the user,
      a device identifier that identifies a device of the user,
      an entitlement policy identifier that identifies a particular entitlement policy of the plurality of entitlement policies;
   responsive to receipt of a notification from the provisioned entitlements database of the newly provisioned entitlement, generate, a plurality of intermediate entitlement specifications by:
      retrieving, from the entitlements policy database, the particular entitlement policy identified in the record for the newly provisioned entitlement,
      decomposing the offer identifier into its lowest level service identifiers that identify service specifications each providing access to one particular content or particular service of the at least one particular content and particular services,
      assigning the entitlement policy identifier to each of the service identifiers,
      storing each of the service identifiers with the assigned entitlement policy identifier against the account of the user as an individual one of the plurality of intermediate entitlement specifications;
   receive a request from the device of the user for at least one entitlement associated with the account of the user;
   responsive to the request, identify the account identifier of the account of the user and use the account identifier to retrieve one or more intermediate entitlement specifications of the plurality of intermediate entitlement specifications stored against the account of the user;
   calculate a run-time entitlement for each of the retrieved one or more intermediate entitlement specifications; and
   return each of the calculated run-time entitlements to the device of the user for use in accessing at least a subset of the at least one of the particular content and the particular services.

2. The non-transitory computer readable medium of claim 1, wherein the request from the device of the user is for at least one entitlement associated with a specified one of the at least one particular content and particular services.

3. The non-transitory computer readable medium of claim 2, wherein the run-time entitlement is calculated by identifying service or content information in connection with the request.

4. The non-transitory computer readable medium of claim 3, wherein the service or content information includes at least one of a service type, a content type, a service identifier, a content identifier, or a geo-location.

5. The non-transitory computer readable medium of claim 3, wherein the run-time entitlement is calculated by selecting the one or more intermediate entitlement specifications of the plurality of intermediate entitlement specifications based on the service or content information.

6. An apparatus, comprising:
   at least one computer processor configured for:
      storing, in an entitlements policy database, a plurality of entitlement policies that are configured for being used to determine at least one of content and services allowed to be accessed device;
      storing, in a provisioned entitlements database, a record for a newly provisioned entitlement including:
         an offer identifier that specifies an offer made to a user for an entitlement to at least one of particular content and particular services,
         an account identifier that identifies an account of a user that accepted the offer,
         a user identifier that identifies the user,
         a device identifier that identifies a device of the user,
         an entitlement policy identifier that identifies a particular entitlement policy of the plurality of entitlement policies;
      responsive to receipt of a notification from the provisioned entitlements database of the newly provisioned entitlement, generating a plurality of intermediate entitlement specifications by:
         retrieving, from the entitlements policy database, the particular entitlement policy identified in the record for the newly provisioned entitlement,
         decomposing the offer identifier into its lowest level service identifiers that identify service specifications each providing access to one particular content or particular service of the at least one particular content and particular services, assigning the entitlement policy identifier to each of the service identifiers, storing each of the service identifiers with the assigned entitlement policy identifier against the account of the user as an individual one of the plurality of intermediate entitlement specifications;

receiving a request from the device of the user for at least one entitlement associated with the account of the user;

responsive to the request, identifying the account identifier of the account of the user and using the account identifier to retrieve one or more intermediate entitlement specifications of the plurality of intermediate entitlement specifications stored against the account of the user;

calculating a run-time entitlement for each of the retrieved one or more intermediate entitlement specifications; and returning each of the calculated run-time entitlements to the device of the user for use in accessing at least a subset of the at least one of the particular content and the particular services.

7. A method, comprising:

storing, in an entitlements policy database, a plurality of entitlement policies that are configured for being used to determine at least one of content and services allowed to be accessed;

storing, in a provisioned entitlements database, a record for a newly provisioned entitlement including:
  an offer identifier that specifies an offer made to a user for an entitlement to at least one of particular content and particular services,
  an account identifier that identifies an account of a user that accepted the offer,
  a user identifier that identifies the user,
  a device identifier that identifies a device of the user,
  an entitlement policy identifier that identifies a particular entitlement policy of the plurality of entitlement policies;

responsive to receipt of a notification from the provisioned entitlements database of the newly provisioned entitlement, generating, utilizing a computer processor, a plurality of intermediate entitlement specifications by:
  retrieving, from the entitlements policy database, the particular entitlement policy identified in the record for the newly provisioned entitlement,
  decomposing the offer identifier into its lowest level service identifiers that identify service specifications each providing access to one particular content or particular service of the at least one particular content and particular services,
  assigning the entitlement policy identifier to each of the service identifiers,
  storing each of the service identifiers with the assigned entitlement policy identifier against the account of the user as an individual one of the plurality of intermediate entitlement specifications;

receiving, by the computer processor, a request from the device of the user for at least one entitlement associated with the account of the user;

responsive to the request, identifying, by the computer processor, the account identifier of the account of the user and using the account identifier to retrieve one or more intermediate entitlement specifications of the plurality of intermediate entitlement specifications stored against the account of the user;

calculating, by the computer processor, a run-time entitlement for each of the retrieved one or more intermediate entitlement specifications; and returning, by the computer processor, each of the calculated run-time entitlements to the device of the user for use in accessing at least a subset of the at least one of the particular content and the particular services.

* * * * *